US011929879B2

(12) United States Patent
Li

(10) Patent No.: US 11,929,879 B2
(45) Date of Patent: Mar. 12, 2024

(54) NS INSTANTIATION METHOD AND NFVO

(71) Applicant: Huawei Technologies Co., Ltd., Shenzhen (CN)

(72) Inventor: Shitao Li, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/731,714

(22) Filed: Apr. 28, 2022

(65) Prior Publication Data
US 2022/0255803 A1 Aug. 11, 2022

Related U.S. Application Data

(63) Continuation of application No. PCT/CN2020/107121, filed on Aug. 5, 2020.

(30) Foreign Application Priority Data

Nov. 5, 2019 (CN) .......................... 201911072099.5

(51) Int. Cl.
*H04L 41/0895* (2022.01)
*G06F 9/455* (2018.01)
(Continued)

(52) U.S. Cl.
CPC ...... *H04L 41/0895* (2022.05); *G06F 9/45558* (2013.01); *H04L 41/0806* (2013.01); *G06F 2009/45595* (2013.01)

(58) Field of Classification Search
CPC ............. H04L 41/0895; H04L 41/0806; G06F 9/45558; G06F 2009/45595; G06F 2009/45562; G06F 2009/45575
(Continued)

(56) References Cited

U.S. PATENT DOCUMENTS

2007/0157078 A1* 7/2007 Anderson ............. G06F 40/143
707/999.1
2009/0150769 A1* 6/2009 Konnola ............... G06F 16/951
707/999.005
(Continued)

FOREIGN PATENT DOCUMENTS

CN 105873234 A 8/2016
CN 106161049 A 11/2016
(Continued)

OTHER PUBLICATIONS

G. Klyne et al., "Date and Time on the Internet: Timestamps," RFC 3339, Jul. 2002, 18 pages.
(Continued)

*Primary Examiner* — David R Lazaro
*Assistant Examiner* — Berhanu Shitayewoldetadik
(74) *Attorney, Agent, or Firm* — Conley Rose, P.C.

(57) ABSTRACT

A network service (NS) instantiation method is applied to a network functions virtualization orchestrator (NFVO). The method includes receiving an NS instantiation request; determining a network service description information (NSD) based on the NS instantiation request, where the NSD includes a node type of a virtualized network function (VNF); obtaining VNF package info associated with the node type; obtaining an identifier of a virtualized network function description information (VNFD) from VNF package info; and requesting, based on the identifier of the VNFD, a virtualized network function manager (VNFM) to instantiate the VNF.

19 Claims, 5 Drawing Sheets

(51) Int. Cl.
*G06F 15/16* (2006.01)
*G06F 15/173* (2006.01)
*H04L 12/24* (2006.01)
*H04L 12/46* (2006.01)
*H04L 15/16* (2006.01)
*H04L 41/0806* (2022.01)
*H04L 43/10* (2022.01)
*H04L 45/28* (2022.01)

(58) Field of Classification Search
USPC .......................................................... 709/222
See application file for complete search history.

(56) References Cited

U.S. PATENT DOCUMENTS

| | | | | |
|---|---|---|---|---|
| 2010/0004944 | A1* | 1/2010 | Palaniappan | G06Q 10/10 |
| | | | | 707/E17.108 |
| 2016/0063093 | A1* | 3/2016 | Boucher | G06F 16/3322 |
| | | | | 707/748 |
| 2016/0179819 | A1* | 6/2016 | Narayanan | G06F 3/0482 |
| | | | | 707/728 |
| 2016/0188622 | A1* | 6/2016 | Sharangpani | G06F 16/1744 |
| | | | | 707/693 |
| 2016/0188668 | A1* | 6/2016 | Sharangpani | G06F 16/9027 |
| | | | | 707/718 |
| 2017/0063598 | A1 | 3/2017 | Zhu et al. | |
| 2018/0234714 | A1* | 8/2018 | Johns | G06F 16/172 |
| 2019/0013952 | A1* | 1/2019 | Abt, Jr. | H04L 9/30 |
| 2019/0014056 | A1 | 1/2019 | Sharma et al. | |
| 2019/0149408 | A1* | 5/2019 | Li | H04L 41/40 |
| | | | | 709/223 |
| 2019/0188285 | A1* | 6/2019 | Scheau | G06F 16/9038 |
| 2020/0021487 | A1* | 1/2020 | Yao | H04L 41/40 |
| 2020/0034165 | A1* | 1/2020 | Chou | H04L 41/5045 |
| 2020/0322660 | A1* | 10/2020 | Johns | H04N 21/266 |

FOREIGN PATENT DOCUMENTS

| | | | | |
|---|---|---|---|---|
| CN | 106982131 | A | 7/2017 | |
| CN | 107210957 | A | 9/2017 | |
| CN | 107332750 | A | 11/2017 | |
| CN | 107689882 | A | 2/2018 | |
| CN | 109347716 | A | 2/2019 | |
| CN | 3471342 | A1 * | 6/2019 | ............ H04L 12/24 |
| EP | 3471342 | A1 | 4/2019 | |
| WO | 2016121802 | A1 | 8/2016 | |
| WO | 2019132314 | A1 | 7/2019 | |

OTHER PUBLICATIONS

Oasis Standard, "TOSCA Simple Profile in YAML Version 1.2," Jan. 17, 2019, 354 pages.

* cited by examiner

NS INSTANTIATION METHOD AND NFVO

CROSS-REFERENCE TO RELATED APPLICATIONS

This is a continuation of International Patent Application No. PCT/CN2020/107121 filed on Aug. 5, 2020, which claims priority to Chinese Patent Application No. 201911072099.5 filed on Nov. 5, 2019. The disclosures of the aforementioned applications are hereby incorporated by reference in their entireties.

TECHNICAL FIELD

This disclosure relates to the computer field, and in particular, to a network service (NS) instantiation method and a network functions virtualization orchestrator (NFVO).

BACKGROUND

Network functions virtualization (NFV) is using a general-purpose hardware device and a virtualization technology to carry a function of a dedicated device in a network, so that a network function and an NS no longer depend on the dedicated device, to reduce the high costs of deploying the dedicated device. In addition, various resources in a cloud platform can be flexibly shared, to rapidly develop and deploy various new NSs based on actual service requirements.

A virtualization layer is introduced into the NFV, to implement a virtualized network function (VNF) and life cycle management of the NS through network management and orchestration. The NS generally includes one or more VNFs. In other words, the NS is an upper layer network service implemented by using the one or more VNFs. If a service requester needs to instantiate an NS, that is, the service requester needs to deploy an NS, the service requester may provide network service description information (NSD, network Service descriptor) of the NS for a service provider. The NSD may also be referred to as an NS deployment template, and may describe virtualized network function description information (VNFD) of each VNF based on a node type of each VNF. The VNFD may also be referred to as a VNF deployment template. The VNFD is used to describe the VNF, for example, describe software and virtual resources that need to be run by the VNF, for example, a central processing unit (CPU) resource and a storage resource. Correspondingly, the service provider may parse the NSD to obtain node types that are of the one or more VNFs and that are included in the NSD. For each obtained node type, a VNFD used to instantiate a corresponding VNF can be determined, so that the corresponding VNF is instantiated based on the determined VNFD to complete the instantiation of the NS.

However, the VNFD used to support the instantiation of the VNF is generally located in a virtualized network function package (VNFP). The VNF package further includes a definition file of the node type of the VNF. The definition file of the node type may not have a fixed storage path or a fixed file name in the VNF package. In this case, in a process of instantiating the NS based on the NSD of the NS, a relatively long time needs to be consumed to manually parse the VNF package in a manual processing manner for the node type that is of each VNF and that is included in the NSD, to determine an identifier of the VNFD used to support the instantiation of the VNF corresponding to the node type. In this case, instantiation efficiency of the NS is relatively low.

SUMMARY

Embodiments of this disclosure provide an NS instantiation method and an NFVO, to improve instantiation efficiency of an NS.

Embodiments of this disclosure at least provide the following technical solutions:

A first aspect provides an NS instantiation method. The method is applied to an NFVO. The method includes receiving an NS instantiation request; determining an NSD based on the NS instantiation request, where the NSD includes a node type of a VNF; obtaining virtualized network function package information (VNFPI) associated with the node type, and obtaining an identifier of a VNFD from the VNFPI; and requesting, based on the identifier of the VNFD, a virtualized network function manager (VNFM).

In a possible implementation, before the receiving an NS instantiation request, the method further includes obtaining the node type from a VNFP, and associating the node type with the VNFPI, and obtaining the identifier of the VNFD from the VNFP, and storing the identifier of the VNFD in the VNFPI.

In a possible implementation, the VNFP includes a meta file, the meta file includes a declaration keyword, and a value of the declaration keyword is the node type; and the obtaining the node type from a VNFP includes searching for the declaration keyword in the meta file included in the VNFP, and obtaining the node type from the declaration keyword.

In a possible implementation, the VNFP includes a meta file, the meta file includes a declaration keyword, and a value of the declaration keyword is a storage path of a definition file of the node type in the VNFP; and the obtaining the node type from a VNFP includes searching for the declaration keyword in the meta file included in the VNFP, obtaining the storage path of the definition file of the node type in the VNFP from the declaration keyword, and obtaining the node type from the definition file of the node type based on the storage path.

In a possible implementation, before the receiving an NS instantiation request, the method further includes determining address information of the definition file of the node type based on the storage path and a storage location of the VNFP; and sending the node type and the address information to a service requester, so that the service requester generates the NSD, where the NSD includes the node type and the address information.

In a possible implementation, the associating the node type with the VNFPI includes determining an identifier of the VNFPI, and associating the node type with the identifier of the VNFPI; and the obtaining VNFPI associated with the node type includes obtaining the identifier of the VNFPI associated with the node type, and obtaining the VNFPI based on the identifier of the VNFPI.

In a possible implementation, the VNFP includes a manifest file, and the manifest file includes the identifier of the VNFD; and the obtaining the identifier of the VNFD from the VNFP includes obtaining the identifier of the VNFD from the manifest file included in the VNFP.

A second aspect provides an NFVO. The NFVO includes a transceiver unit configured to receive a network service NS instantiation request; and a processing unit configured to determine an NSD based on the NS instantiation request, where the NSD includes a node type of a VNF; obtain VNFPI associated with the node type; obtain an identifier of a VNFD from the VNFPI; and request, based on the identifier of the VNFD, a VNFM to instantiate the VNF.

In a possible implementation, the processing unit is further configured to obtain the node type from a VNFP, associate the node type with the VNFPI, obtain the identifier of the VNFD from the VNFP, and store the identifier of the VNFD in the VNFPI.

In a possible implementation, the VNFP includes a meta file, the meta file includes a declaration keyword, and a value of the declaration keyword is the node type; and the processing unit is configured to search for the declaration keyword in the meta file included in the VNFP, and obtain the node type from the declaration keyword.

In a possible implementation, the VNFP includes a meta file, the meta file includes a declaration keyword, and a value of the declaration keyword is a storage path of a definition file of the node type in the VNFP; and the processing unit is configured to search for the declaration keyword in the meta file included in the VNFP; obtain the storage path of the definition file of the node type in the VNFP from the declaration keyword; and obtain the node type from the definition file of the node type based on the storage path.

In a possible implementation, the processing unit is further configured to determine address information of the definition file of the node type based on the storage path and a storage location of the VNFP; and the transceiver unit is further configured to send the node type and the address information to a service requester, so that the service requester generates the NSD, where the NSD includes the node type and the address information.

In a possible implementation, the processing unit is configured to determine an identifier of the VNFPI, associate the node type with the identifier of the VNFPI, obtain the identifier of the VNFPI associated with the node type, and obtain the VNFPI based on the identifier of the VNFPI.

In a possible implementation, the VNFP includes a manifest file, and the manifest file includes the identifier of the VNFD; and the processing unit is configured to obtain the identifier of the VNFD from the manifest file included in the VNFP.

A third aspect provides a computer-readable storage medium configured to store instructions. When the instructions are executed by a processor of a computing device, the computing device is enabled to implement the method according to any implementation of the first aspect.

A fourth aspect provides a computer program product. The computer program product includes computer program code. When the computer program code is run on a computing device, the computing device is enabled to perform the method according to any implementation of the first aspect.

A fifth aspect provides a computing device, including a memory and a processor. The memory stores executable code. When the processor executes the executable code, the method according to any implementation of the first aspect is implemented.

A sixth aspect provides a chip system. The chip system includes a processor that is configured to implement functions of the NFVO in the foregoing aspects, for example, receive or process data and/or information in the method according to the first aspect. In a possible implementation, the chip system further includes a memory. The memory is configured to store program instructions and/or data. The chip system may include a chip, or may include a chip and another discrete device.

Based on the technical solutions provided in embodiments of this disclosure, the NFVO may associate VNF package info with the node type that is of the VNF and that is included in the NSD, and store the identifier of the VNFD in VNF package info. When receiving the NS instantiation request, the NFVO may first determine the NSD of the NS that needs to be instantiated; obtain VNF package info associated with the node type for the node type that is of the VNF and that is included in the NSD; and then obtain the identifier of the VNFD from VNF package info. Then, the NFVO may request, based on the identifier of the VNFD, the VNFM to instantiate the VNF. In this way, in a process of instantiating the NS based on the NSD of the NS, the identifier of the VNFD used to support the instantiation of the VNF can be quickly determined without consuming a relatively long time to manually parse the VNF package, to more quickly complete the instantiation of the VNF included in the NS, thereby improving instantiation efficiency of the NS.

BRIEF DESCRIPTION OF DRAWINGS

The following briefly describes the accompanying drawings that need to be used in the descriptions of the embodiments or the conventional technology.

DESCRIPTION OF EMBODIMENTS

The following describes the technical solutions in embodiments of this disclosure with reference to the accompanying drawings in embodiments of this disclosure.

Figure 1:
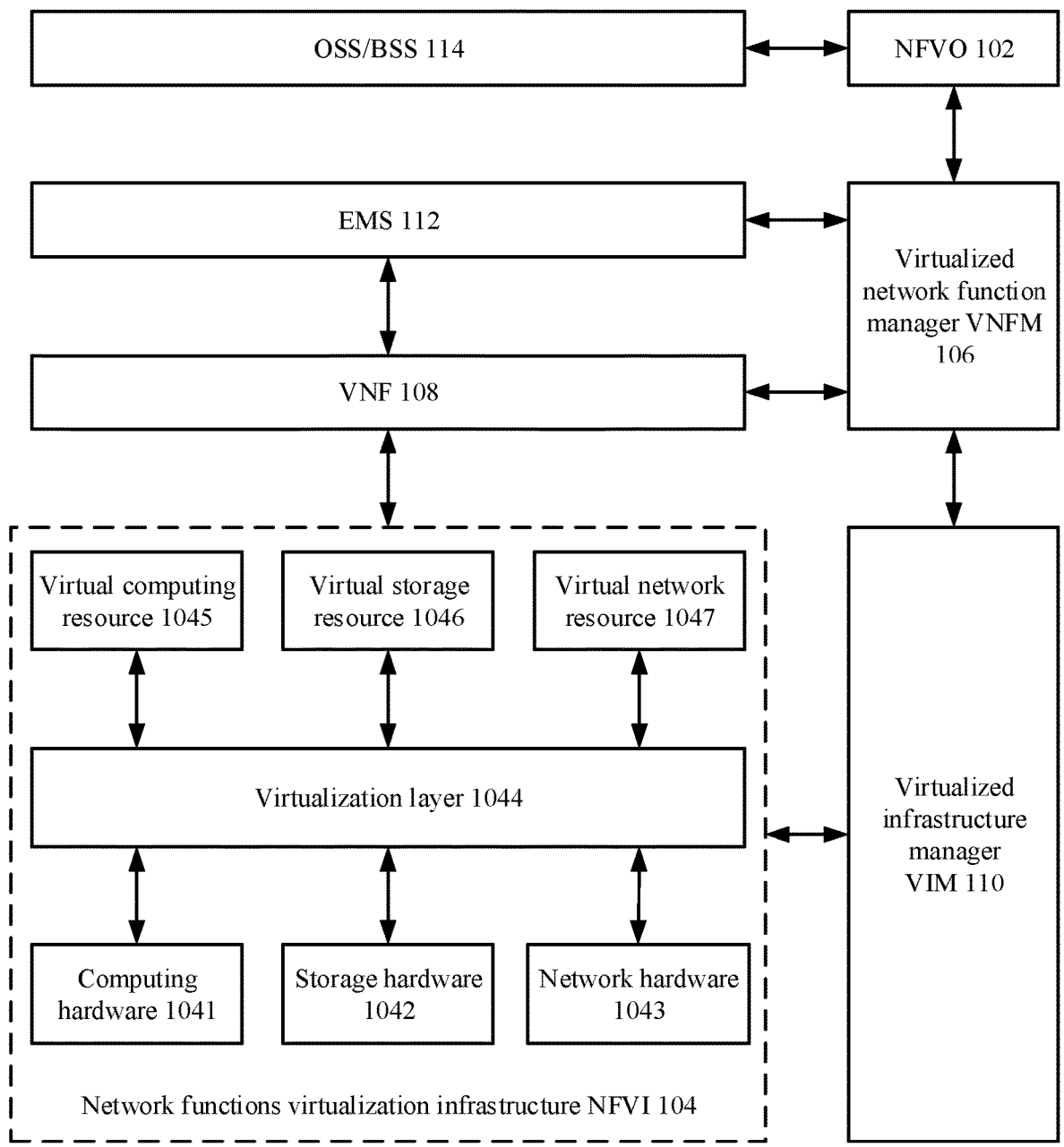
FIG. 1 is a block diagram of architecture of a network functions virtualization system according to an embodiment of this disclosure.

FIG. 1 is a block diagram of architecture of a network functions virtualization system according to an embodiment of this disclosure. As shown in FIG. 1, the NFV system 100 includes the following functional entities.

An NFVO 102 is mainly configured to be responsible for life cycle management of an NS, and be responsible for allocation and scheduling of virtual resources in network functions virtualization infrastructure (NFVI) 104. The NFVO 102 may communicate with one or more VNFMs 106 to perform an operation related to instantiation of the NS, for example, send corresponding configuration information to the VNFM 106 and request status information of one or more VNFs 108 from the VNFM 106. In addition, the NFVO 102 may further communicate with a virtualized infrastructure manager (VIM) 110, allocate and/or reserve resources in the NFVI 104, exchange resource configuration and status information, and the like.

The VNFM 106 is responsible for life cycle management of the one or more VNFs 108, for example, instantiating the VNF 108, updating the VNF 108, querying the VNF 108, scaling the VNF 108, or terminating the VNF 108. The VNFM 106 may communicate with the VNF 108, to manage a life cycle of the VNF 108, exchange configuration information and status information with the VNF, and the like. It may be understood that the NFV system 100 may include one or more VNFMs 106, and each VNFM 106 separately performs life cycle management on different types of VNFs 108.

The NFVI 104 indicates infrastructure of the NFV system 100, and includes a hardware component, a software component, or a combination thereof, to establish a virtualized environment and deploy, manage, and implement the VNF 108 in the virtualized environment. The NFVI 104 may include at least computing hardware 1041, storage hardware 1042, and network hardware 1043. A virtualization layer 1044 of the NFVI 104 may abstract the foregoing hardware, decouple hardware and the VNF 108, and obtain a corresponding virtual computing resource 1045, a virtual storage resource 1046, and a virtual network resource 1047, to provide a virtual machine and another form of a virtualized container for the VNF 108.

The VIM 110 is configured to control and manage interaction between the VNF 108 and each of the computing hardware 1041, the storage hardware 1042, the network hardware 1043, the virtual computing resource 1045, the virtual storage resource 1046, and the virtual network resource 1047. For example, the VIM 110 may execute a resource management function, for example, adding a corresponding virtual resource to a virtual machine or another form of virtual container, and collecting fault information of the NFVI 104 in a system running process. In addition, the VIM 110 may communicate with the VNFM 106, for example, receive a resource allocation request from the VNFM 106, and feed back resource configuration and status information to the VNFM 106.

The VNF 108 may run in one or more virtual machines or other forms of virtual containers, and correspond to a group of network functions originally implemented by a dedicated device.

An equipment management system (EMS) 112 may be configured to configure and manage the VNF 108, and initiate a life cycle management operation such as the instantiation of the VNF 108 to the VNFM 106. It may be understood that the NFV system 100 may include one or more EMSs 112.

An operations support system (OSS) or a business support system (BSS) 114 may support various end-to-end telecommunications services. A management function supported by the OSS may include network configuration, service providing, fault management, and the like. The BSS may be used to process an order, payment, income, and a related service, and supports functions such as product management, order management, profit management, and customer management. The OSS/BSS 114 may be used as a service requester to request the NFVO to instantiate the NS, and the OSS/BSS 114 or a computing device on which the OSS/BSS 114 depends may generally be correspondingly referred to as a service requester.

It may be understood that in the NFV system 100 shown in FIG. 1, the foregoing functional entities may be separately deployed in different computing devices, or some functional entities may be integrated into the same computing device.

A VNFD used to support the instantiation of the VNF included in the NS is generally located in a VNF package. The VNF package includes a definition file of a node type of the VNF. The definition file of the node type may not have a fixed storage path or a fixed file name in the VNF package. In this way, in a process in which the NFVO 102 instantiates the NS based on an NSD of the NS, a relatively long time needs to be consumed to manually parse the VNF package in a manual processing manner for the node type that is of each VNF and that is included in the NSD, to determine an identifier of the VNFD used to instantiate the VNF corresponding to the node type. In this case, instantiation efficiency of the NS is relatively low.

In view of this, embodiments of this disclosure at least provide an NS instantiation method and an NFVO. The NFVO may serve as the service provider to associate VNF package info with the node type that is of the VNF and that is included in the NSD and store the identifier of the VNFD in VNF package info. When receiving an NS instantiation request from the service requester (for example, as shown in FIG. 1, the OSS/BSS or the computing device on which the OSS/BSS is deployed), the NFVO may first obtain, based on the node type that is of the VNF and that is included in the NSD of the NS that needs to be instantiated, VNF package info associated with the node type, and then obtain the identifier of the VNFD from VNF package info. Then, the NFVO may request, based on the identifier of the VNFD, the VNFM to instantiate the VNF.

In this way, in the process of instantiating the NS based on the NSD of the NS, the identifier of the VNFD used to support the instantiation of the VNF can be quickly determined without consuming a relatively long time to manually parse the VNF package, to more quickly complete the instantiation of the VNF included in the NS, thereby improving instantiation efficiency of the NS.

It may be understood that the VNFM 106 is a functional entity responsible for instantiating the VNF 108. The VNFM 106 may receive a VNF instance identifier create request that carries the identifier of the VNFD from the NFVO 102, and create/allocate a VNF instance identifier corresponding to the identifier of the VNFD. After the VNF instance identifier created/allocated by the VNFM is returned to the NFVO, the NFVO may further send, to the VNFM, a VNF instantiation request carrying the VNF instance identifier. After receiving the VNF instantiation request that carries the VNF instance identifier from the NFVO, the VNFM may obtain, based on the identifier of the corresponding VNFD, a corresponding VNFD or a VNF package including the VNFD; then, apply for a virtual resource from the VIM 110 based on the VNFD that is obtained by the VNFM or the VNF package that includes the VNFD and that is obtained by the VNFM; and configure an instance of the VNF 108 after the virtual resource is applied for, to complete instantiation of the VNF 108 and further complete the instantiation of the NS.

The following describes in detail steps of instantiating the NS.

Figure 2:
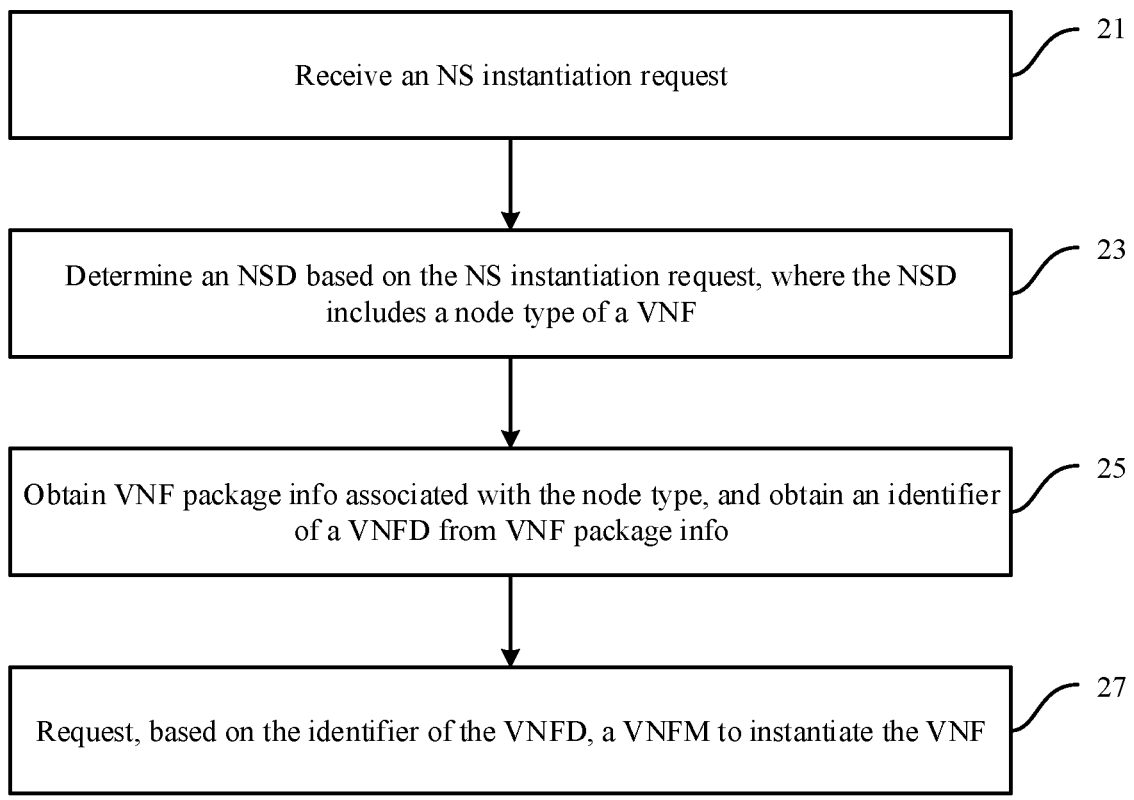
FIG. 2 is a schematic flowchart of an NS instantiation method according to an embodiment of this disclosure.

As shown in FIG. 2, an embodiment of this disclosure provides an NS instantiation method. The method is applied to an NFVO, and may include at least the following steps 21 to 27.

Step 21: Receive an NS instantiation request.

Herein, the NS instantiation request is from a service requester. The service requester includes but is not limited to the OSS or the BSS shown in FIG. 1. The NS instantiation request is used to request the NFVO to instantiate a corresponding NS.

Step 23: Determine an NSD based on the NS instantiation request, where the NSD includes a node type of a VNF.

Herein, the determined NSD is an NSD of an NS that needs to be deployed by the service requester that sends the NS instantiation request.

It may be understood that NFV may use any one of a plurality of specifications to define the NSD of the NS and define a VNFD of each included VNF for supporting the instantiation of the NS. Regardless of what specification is used to define the NSD, the NSD includes the node type of each VNF included in the NS that needs to be deployed by the service requester.

In some embodiments, the NSD may further include one or more pieces of dynamic information required during the instantiation of the VNF, for example, an instantiation level, a minimum quantity of instances (min number of instances), and a maximum quantity of instances (max number of instances). The dynamic information and the node type of the VNF may form node information of the VNF in the NSD (or be referred to as a node definition of the VNF).

Step 25: Obtain VNF package info associated with the node type, and obtain an identifier of the VNFD from VNF package info.

Herein, for each VNF included in the NS that needs to be deployed by the service requester, the node type of each VNF is included in the NSD of the NS. For each node type included in the NSD, if the NFVO has associated the node type with corresponding VNF package info, the NFVO may quickly obtain, from VNF package info associated with the node type, the identifier of the VNFD used to support instantiation of the VNF corresponding to the node type.

Step 27: Request, based on the identifier of the VNFD, a VNFM to instantiate the VNF.

As described above, after receiving the identifier of the VNFD, the VNFM may perform corresponding processing to complete the instantiation of the VNF and further complete the instantiation of the NS.

In the embodiment shown in FIG. 2, in the process in which the NFVO instantiates the NS based on the NSD of the NS, the identifier of the VNFD used to support the instantiation of the VNF can be quickly determined without consuming a relatively long time to manually parse the VNF package, to more quickly complete the instantiation of the VNF included in the NS, thereby improving instantiation efficiency of the NS.

It may be understood that, for each VNF included in the NS that needs to be deployed by the service requester, each VNF may respectively correspond to one VNF package. For a single VNF included in the NS that needs to be deployed, the VNFD used to support the instantiation of the VNF is included in the VNF package corresponding to the VNF, and the VNF package further includes the node type of the VNF and the identifier of the VNFD.

Correspondingly, in a possible implementation, before receiving the NS instantiation request from the service requester, the NFVO may create VNF package info in the NFVO for each VNF included in the NS that needs to be deployed by the service requester, obtain the node type of the VNF from the VNF package corresponding to the VNF, associate the node type with VNF package info, then, obtain the identifier of the VNFD included in the VNF package from the VNF package corresponding to the VNF, and store the identifier of the VNFD in VNF package info.

In an example, the NFVO may allocate the identifier of VNF package info for VNF package info created by the NFVO, and associate the identifier of VNF package info with the node type of the corresponding VNF, to associate the node type of the corresponding VNF with VNF package info.

As described above, the NFV may use any one of the plurality of specifications to define the NSD of the NS and define the VNFD of each included VNF for supporting the instantiation of the NS. For ease of description, in embodiments of this disclosure, the technical solutions in embodiments of this disclosure are described by mainly using an example in which the NFV uses a topology and orchestration specification for cloud applications (TOSCA) to define the NSD and the VNFD.

When the VNFD is defined by using the TOSCA, the VNFD is generally located in a VNF package in a zip format. The VNF package also complies with a packing format defined by using the TOSCA. For example, when the VNFD is defined by using the TOSCA, the VNF package including the VNFD may have a file structure shown in FIG. 3.

Figure 3:
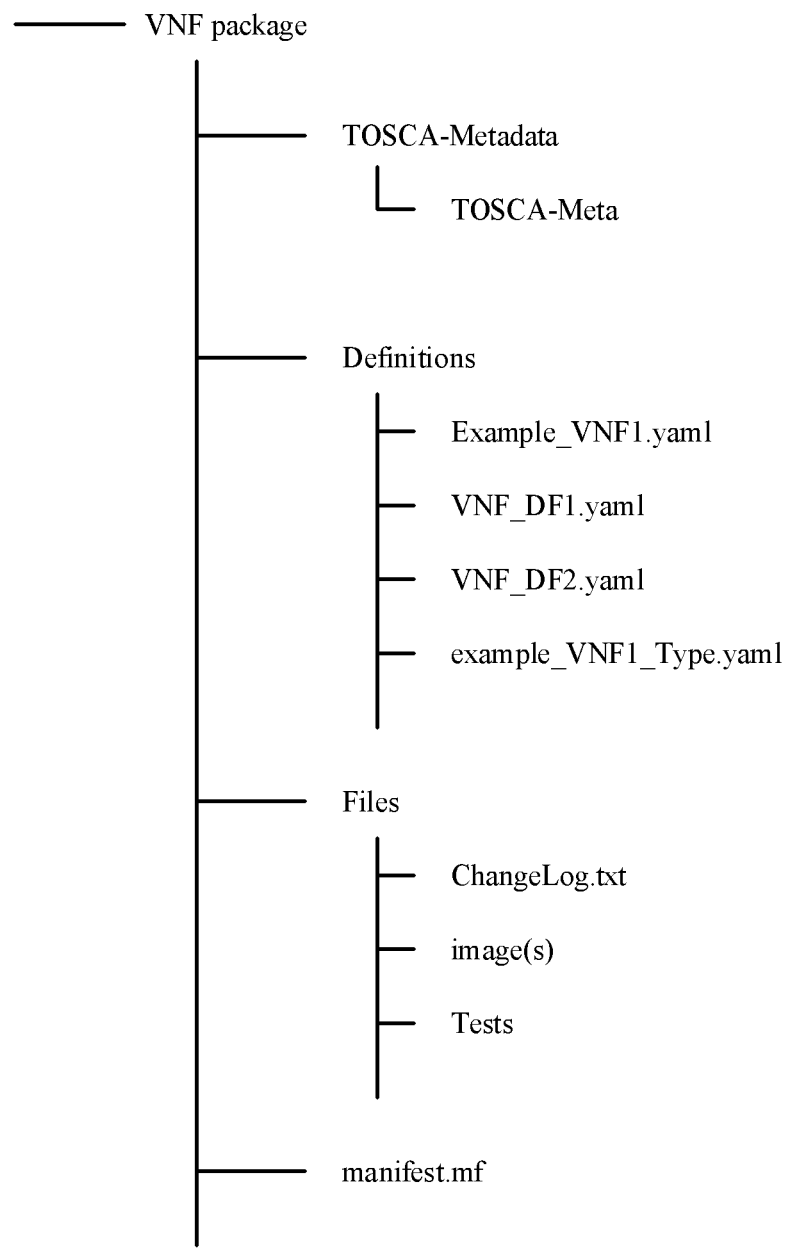
FIG. 3 is a diagram of a file structure of a VNF package according to an embodiment of this disclosure.

As shown in FIG. 3, the VNF package may include a top-level file "TOSCA-Metadata". Herein, "TOSCA-Metadata" includes a meta file "TOSCA-Meta", and "TOSCA-Meta" describes basic information of the VNF package. For example, the meta file "TOSCA-Meta" may describe at least the following information of the VNF package:

TOSCA-Meta-File-Version: 1.1 #Version number of a file format with which "TOSCA-Meta" complies. For example, the version number is 1.1 in the TOSCA-simple-profile-yaml-v1.2 standard.

CSAR-Version: 1.1 #Version number of a packaging format with which the VNF package complies. For example, the version number is 1.1 in the TOSCA-simple-profile-yaml-v1.2 standard.

Created-By: OASIS TOSCA TC #Designer of the VNF package. For example, the designer may be OASIS TOSCA TC.

Entry-Definitions: definitions/Example_VNF1.yaml #Address of an entry file of the VNF package in the VNF package. For example, a file "Example_VNF1.yaml" is a TOSCA file that needs to be processed first except a top level file in the VNF package, where the file may be placed in a "definitions" folder of the VNF package. The entry file may be a "yaml" format file complying with TOSCA syntax.

In the file structure of the VNF package shown in FIG. 3, "example_VNF1_Type.yaml" may be the definition file of the node type of the VNF corresponding to the VNF package.

It may be understood that, for the node type of the VNF corresponding to the VNF package, the definition file of the node type may have different names in different VNF packages and different locations in different VNF packages.

It may be understood that the definition file of the node type of the VNF may include the node type of the VNF, and may further include a property (properties) of the node type, a descriptor identifier (descriptor_id), a type of a descriptor identifier, a flavor identifier (flavour_id), a type of a flavor identifier, and the like.

Correspondingly, in an example, in order that the NFVO quickly obtains the node type of the VNF corresponding to the VNF package from the VNF package, the meta file of the VNF package includes a declaration keyword, and a value of the declaration keyword is the node type of the VNF corresponding to the VNF package.

For example, the declaration keyword is "Declaration", and the node type included in "example_VNF1_Type.yaml" is "tosca.nodes.nfv.example_VNF1". Herein, "example_VNF1_Type.yaml" may be stored in the meta file "TOSCA-Meta" as the value of "Declaration". For example, the meta file "TOSCA-Meta" included in the VNF package may include at least the following information of the VNF package:

TOSCA-Meta-File-Version: 1.1
CSAR-Version: 1.1
Created-By: OASIS TOSCA TC
Entry-Definitions: definitions/Example_VNF1.yaml Declaration: tosca.nodes.nfv.example_VNF1 #Information newly added to "TOSCA-Meta" of the VNF package in this embodiment of this disclosure.

Correspondingly, the NFVO may search for the declaration keyword in the meta file included in the VNF package, and obtain the node type of the VNF corresponding to the VNF package from the declaration keyword. For example, the NFVO searches for "Declaration" in "TOSCA-Meta" included in the VNF package, and obtains the value "tosca.nodes.nfv.example_VNF1" of "Declaration".

In another example, in order that the NFVO quickly obtains the node type of the VNF corresponding to the VNF package from the VNF package, the meta file of the VNF package includes a declaration keyword, and a value of the declaration keyword is a storage path of the definition file of the node type of the VNF corresponding to the VNF package in the VNF package.

For example, the declaration keyword is "Declaration", and the node type included in "example_VNF1_Type.yaml" is "tosca.nodes.nfv.example_VNF1". Herein, a storage path of "example_VNF1_Type.yaml" in the VNF package is "definitions/example_VNF1_Type.yaml". In this case, "definitions/example_VNF1_Type.yaml" may be stored in the meta file "TOSCA-Meta" as the value of "Declaration". For example, the meta file "TOSCA-Meta" included in the VNF package may include at least the following information of the VNF package:

TOSCA-Meta-File-Version: 1.1
CSAR-Version: 1.1
Created-By: OASIS TOSCA TC
Entry-Definitions: definitions/Example_VNF1.yaml
Declaration: definitions/example_VNF1_Type.yaml
Information newly added to "TOSCA-Meta" of the VNF package in this embodiment of this disclosure.

Correspondingly, the NFVO may search for the declaration keyword in the meta file included in the VNF package, obtain the storage path of the definition file of the node type of the VNF corresponding to the VNF package in the VNF package from the declaration keyword, and then obtain, from the definition file of the node type based on the obtained storage path, the node type of the VNF corresponding to the VNF package. For example, "Declaration" is searched for in "TOSCA-Meta" included in the VNF package, and the value "definitions/example_VNF1_Type.yaml" of "Declaration" is obtained. Then, the definition file "example_VNF1_Type.yaml" of the node type is searched for based on "definitions/example_VNF1_Type.yaml", and the node type "tosca.nodes.nfv.example_VNF1" is obtained from "example_VNF1_Type.yaml".

It may be understood that the VNFD included in the VNF package generally includes a plurality of service modules (or referred to as service files). The plurality of service modules may be divided into one top level service template and at least one low level service template. The top level service module is generally defined as the entry file in the meta file included in the VNF package. As shown in FIG. 3, the VNFD included in the VNF package may include a top level service module Example_VNF1.yaml and low level service modules VNF_DF1.yaml and VNF_DF2.yaml. A location of Example_VNF1.yaml in the VNF package may be stored in the meta file TOSCA-Meta of the VNF package.

The top level service module included in the VNF package is mainly used to describe static information of the VNF corresponding to the VNF package, for example, describe information such as the node type, a property (properties), and a requirement of the VNF.

Each low level service module included in the VNF package indicate a VNF deployment flavor (VNF deployment flavour). When the VNF is instantiated, the low level service module that includes the flavor identifier may be selected based on a VNF instantiation request or the flavor identifier carried in the NSD of the NS that needs to be instantiated, to deploy the VNF. It may be understood that, when the VNF is correspondingly deployed based on different deployment flavors, requirements for virtual resources may be different, that is, different low level service modules may have different composition.

For example, a deployment flavor described by VNF_DF2.yaml may be for a scenario in which a large quantity of users are accessed. In this case, two types of virtualization deployment unit (VDU) resources VDU_1 and VDU_2 are needed to jointly provide a service. Herein, VNF_DF1.yaml describes a scenario in which a small quantity of users are accessed. In this case, only VDU_1 needs to be deployed to provide a service.

In the same VNF package, each low level service module included in the VNF package may be associated with the top level service module. The low level service module may be associated with the top level service module by using the node type defined in substitution mapping and the flavor identifier (flavour_id) defined in the property (properties).

For example, the top level service module Example_VNF1.yaml included in the VNF package is described by using the following method:

Tosca definitions version: tosca_simple_yaml_1_2
 #Define a TOSCA service template.
Imports: example_VNF1_Type.yaml #Define the definition file of the node type as an import file.
Topology template: #Description of a topology structure
inputs: #Parameters that can be input
flavour: #Flavor
type: string #Type of a topology structure
required: true #Requirement
node_templates: #Description of a node
 VNF1: #Description of a VNF whose identifier is VNF1
type: tosca.nodes.nfv.example_VNF1 #Node type of the VNF whose identifier is VNF1
properties: #Parameter definitions related to the VNF1
descriptor_id: 12345-xyz #Identifier of the VNFD
flavour_id: get_input(flavour) #flavour_id can be obtained from the VNF instantiation request.
. . .
requirements: #Requirement parameters of the VNF1
 virtual_link #Virtual connection The node type "tosca.nodes.nfv.example_VNF1" can uniquely identify the VNFD to which the top level service module belongs. The value "12345-xyz" of the descriptor identifier (descriptor_id) is the identifier of the VNFD to which the top level service module belongs.

For example, the flavor identifier indicated in the VNF instantiation request is flavour1. The value of flavour in the VNF instantiation request is obtained based on flavour_id in Example_VNF1.yaml by using get_input (flavour), for example, flavour1. In this case, the flavor identifier included in VNF_DF1.yaml is flavour1, the flavor identifier included in VNF_DF1.yaml is flavour2, and VNF_DF1.yaml and VNF_DF2.yaml both include the node type tosca.nodes.nfv.example_VNF1 of the VNF corresponding to the VNF package. Herein, Example_VNF1.yaml may be associated with VNF_DF1.yaml in the two lower level service modules by using tosca.nodes.nfv.example_VNF1 and flavour1, so that the VNFM deploys the VNF based on VNF_DF1.yaml. The deployment includes deploying a VDU, a virtual connection (VL, virtual link), and a connection point (CP) that are included in VNF_DF1.yaml.

Correspondingly, in a possible implementation, because the top level service module of the VNFD included in the VNF package includes the identifier of the VNFD, the NFVO may obtain the identifier of the VNFD from the top level service module of the VNFD included in the VNF package.

To more quickly obtain the identifier of the VNFD included in the VNF package, in another possible implementation, the VNF package may further include a manifest file, and the identifier of the VNFD is included in the manifest file.

The manifest file is an optional file in DOSCA. When the VNF package includes the manifest file, the manifest file is generally used to store information related to authentication and security of the VNF package, and basic information of the VNF package, for example, a name, a release date, and a version number of the VNF package. Information amount stored in the manifest file is relatively small.

In this implementation, the identifier of the VNFD is stored in the manifest file included in the VNF package. In this way, the NFVO can quickly obtain the identifier of the VNFD included in the VNF package from the manifest file including little information, without consuming a relatively long time to fully parse the VNFD included in the VNF package.

For example, a field/primary key (for example, vnfd_id) used to describe the identifier of the VNFD may be added to the manifest file. In this case, the identifier of the VNFD is stored in the manifest file as a value of the field/primary key.

In FIG. 3, "manifest.mf" may be the manifest file included in the VNF package.

It should be noted that the identifier of the VNF package may be the same as the identifier of the VNFD.

It may be understood that the VNF package may further include files other than the files described in the foregoing example, for example, a mirroring (Mirroring) file or a script file required for deploying the VNF. Still with reference to FIG. 3, the VNF package may further include a file "files". Herein, "files" may further include a file "ChangeLog.txt" used to store log information, a file "image(s)" used to store an image required for instantiating the VNF, a file "tests" used to store test data, and the like.

As described above, the NSD of the NS may generally include node information of each VNF included in the NS. The node type of each VNF is correspondingly included in the node information. The definition file of the node type is included in the VNF package. To ensure that the NFVO can effectively trigger the NVFM to instantiate the VNF, after obtaining the NSD of the NS that needs to be deployed by the service requester, the NFVO may parse and check the NSD based on the definition file of the node type of each VNF included in the NS.

Correspondingly, in a possible implementation, to enable the NFVO to more quickly complete parsing and check for the NSD, before receiving the NS instantiation request from the service requester, the NFVO may determine address information of the definition file of the node type based on the storage location of the VNF package and the storage path, in the VNF package, of the definition file of the node type that is of the VNF and that is included in the VNF package; and then, send the node type and the address information to the service requester, so that the service requester generates the NSD that includes the node type and the address information.

For example, the node type of the VNF is tosca.nodes.nfv.example_VNF1, the storage path of the definition file example_VNF1_Type.yaml of the node type in the VNF package is definitions/Example_VNF1.yaml, and the storage location of the VNF package in the NFVO or a computing/storage device accessible to the NFVO is NFVO/VNF package_1. In this case, it may be determined that the address information of the definition file Example_VNF1.yaml of the node type is NFVO/VNF package_1/definitions/Example_VNF1.yaml.

Correspondingly, in a possible implementation, before receiving the NS instantiation request from the service requester, the NFVO may obtain the NSD generated by the service requester; then, obtain, based on the address information included in the NSD, the definition file of the node type from the VNF package stored in the NFVO or the computing/storage device accessible to the NFVO; and check the NSD based on the definition file of the node type.

Figure 4:
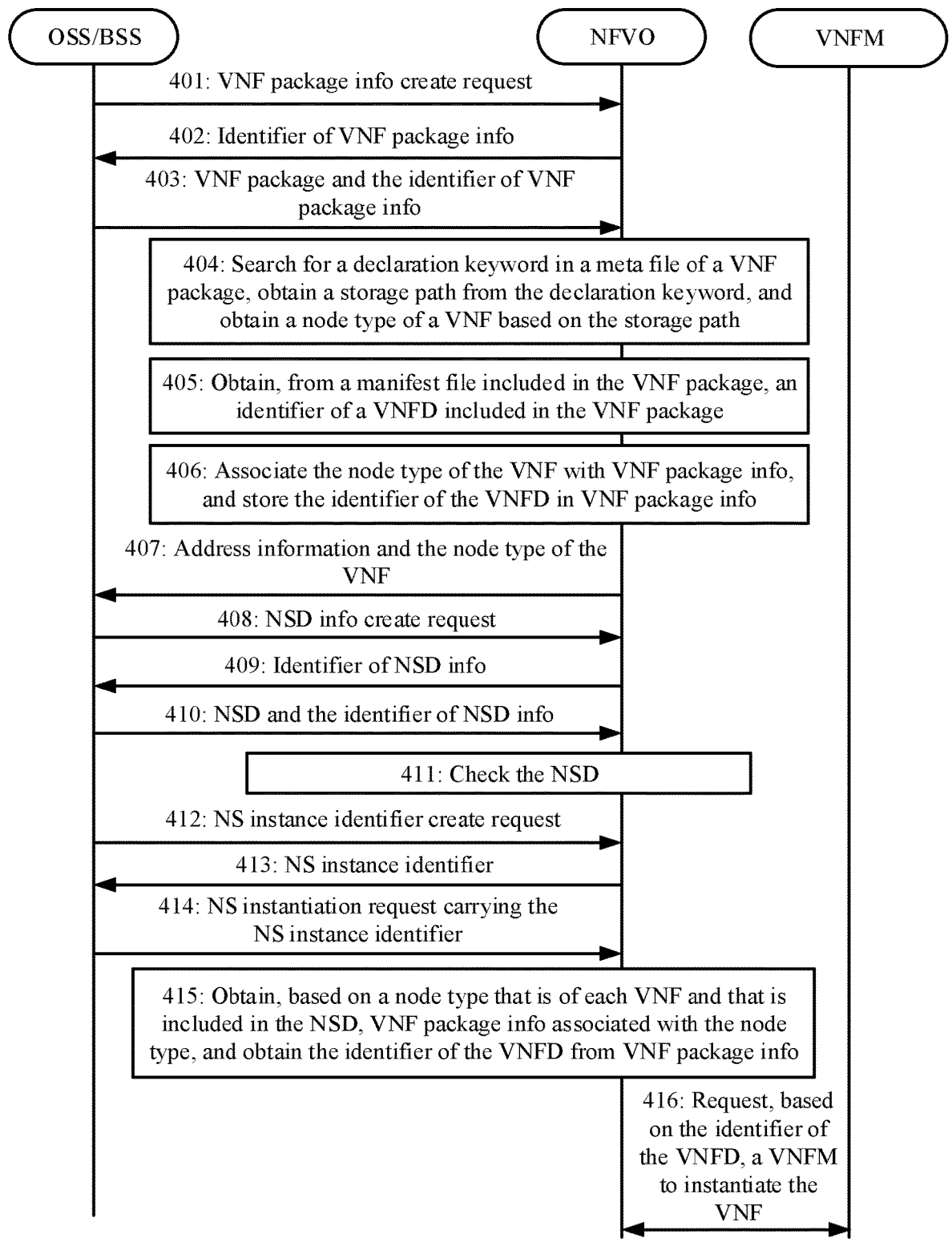
FIG. 4 is a schematic flowchart of another NS instantiation method according to an embodiment of this disclosure.

With reference to the foregoing embodiments, the following describes an example of a process in which the NFVO exchanges information with the OSS/BSS and the VNFM to complete the instantiation of the NS. As shown in FIG. 4, an NS instantiation process may include the following steps 401 to 416.

Step 401: The OSS/BSS sends a VNF package info create request to the NFVO.

It may be understood that the OSS/BSS may separately send the VNF package info create request to the NFVO for each VNF included in the NS that needs to be deployed by the OSS/BSS.

Step 402: The NFVO sends an identifier of VNF package info to the OSS/BSS.

Herein, VNF package info is created by the NFVO when the NFVO receives the VNF package info create request from the OSS/BSS. The identifier of VNF package info is allocated by the NFVO. The identifier of the VNF package info can be used to uniquely identify VNF package info in the NFVO.

Step 403: The OSS/BSS sends the VNF package and the identifier of VNF package info to the NFVO.

Alternatively, the OSS/BSS may send the address information of the VNF package and the identifier of VNF package info to the NFVO, so that the NFVO obtains the VNF package based on the address information of the VNF package.

Step 404: The NFVO searches for the declaration keyword in the meta file of the VNF package, obtains the storage path from the declaration keyword, and obtains, based on the storage path, the node type of the VNF from the definition file that is of the node type and that is included in the VNF package.

Herein, a value of the declaration keyword is the storage path of the definition file of the node type of the VNF corresponding to the VNF package in the VNF package.

Alternatively, a value of the declaration keyword may be the node type of the VNF corresponding to the VNF package.

Step 405: The NFVO obtains, from the manifest file included in the VNF package, the identifier of the VNFD included in the VNF package.

Step 406: The NFVO associates the node type of the VNF with VNF package info, and stores the identifier of the VNFD in VNF package info.

Herein, the NFVO may associate the node type of the VNF corresponding to the VNF package with the identifier of VNF package info, to associate the node type of the VNF with VNF package info.

Step 407: The NFVO sends the address information and the node type of the VNF to the OSS/BSS.

Herein, the address information indicates the address information of the definition file of the node type of the VNF. The NFVO may determine the address information based on the storage path of the definition file of the node type in the VNF package and the storage location of the VNF package in the NFVO or the computing/storage device accessible to the NFVO.

Herein, when the NS that needs to be deployed by the OSS/BSS includes a plurality of VNFs, steps 401 to 407 may be separately performed for each VNF included in the NS that needs to be deployed.

Correspondingly, the OSS/BSS may generate, based on the node type of each VNF and the address information of the definition file of the node type of each VNF that are received by the OSS/BSS, the NSD of the NS that needs to be deployed by the OSS/BSS.

The address information of the definition file of the node type of each VNF may be stored in the NSD as a value of a specified keyword (for example, imports) when the NSD is generated.

Step 408: The OSS/BSS sends an NSD info create request to the NFVO.

Step 409: The NFVO sends an identifier of NSD info to the OSS/BSS.

Herein, NSD info is created by the NFVO when the NFVO receives the NSD info create request from the OSS/BSS. The identifier of NSD info is allocated by the NFVO. The identifier of NSD info can be used to uniquely identify NSD info in the NFVO.

Step 410: The OSS/BSS sends the NSD generated by the OSS/BSS and the identifier of NSD info to the NFVO.

Alternatively, the OSS/BSS may send, to the NFVO, the address information of the NSD generated by the OSS/BSS and the identifier of NSD info, so that the NFVO obtains, based on the address information of the NSD, the NSD generated by the OSS/BSS.

Step 411: The NFVO checks the NSD.

As described above, the NSD may include the node information of each VNF included in the NS that needs to be deployed. The node information of each VNF correspondingly includes the node type of the VNF and dynamic information. The NSD further includes the address information of the definition file of the node type of each VNF in the NFVO.

Correspondingly, for each piece of node information included in the NSD, the NFVO may obtain the definition file of the node type from the corresponding VNF package based on the address information of the definition file of the node type included in the node information, to parse and check, by using the definition file, the dynamic information included in the node information.

If the NSD passes the check, the NFVO may further import, based on the node type in the node information included in the NSD, the dynamic information in the node information correspondingly into the VNFD included in the VNF package.

In a possible implementation, if the NSD passes the check, the NFVO may further obtain, based on each node type included in the NSD, the identifier of VNF package info associated with the node type, and store the identifier of VNF package info in NSD info.

It may be understood that the NFVO may return a check result to the OSS/BSS.

Step 412: The OSS/BSS sends an NS instance identifier create request to the NFVO.

It may be understood that the NS instance identifier create request is used to request the NFVO to create an NS instance identifier associated with NSD info.

Step 413: The NFVO sends an NS instance identifier to the OSS/BSS.

Step 414: The OSS/BSS sends an NS instantiation request carrying the NS instance identifier to the NFVO.

Step 415: The NFVO obtains, based on each node type included in the NSD, VNF package info associated with the node type, and obtains the identifier of the VNFD from VNF package info.

Herein, when the OSS/BSS sends the NSD or the address information of the NSD to the NFVO, the OSS/BSS simultaneously sends the identifier of NSD info. In other words, the identifier of NSD info is associated with the NSD. Therefore, if the NFVO includes a plurality of NSDs, the NFVO may determine, based on the NS instance identifier, the NSD of the NS that needs to be deployed by the OSS/BSS, to perform step 415 and another processing procedure for the determined NSD.

In a possible implementation, when the NFVO has stored, in NSD info, the identifier of VNF package info associated with each node type included in the NSD, the NFVO may obtain, for each identifier of VNF package info included in NSD info, the identifier of the VNFD from VNF package info indicated by the identifier of VNF package info.

416: The NFVO requests, based on the identifier of the VNFD, the VNFM to instantiate the VNF.

Figure 5:
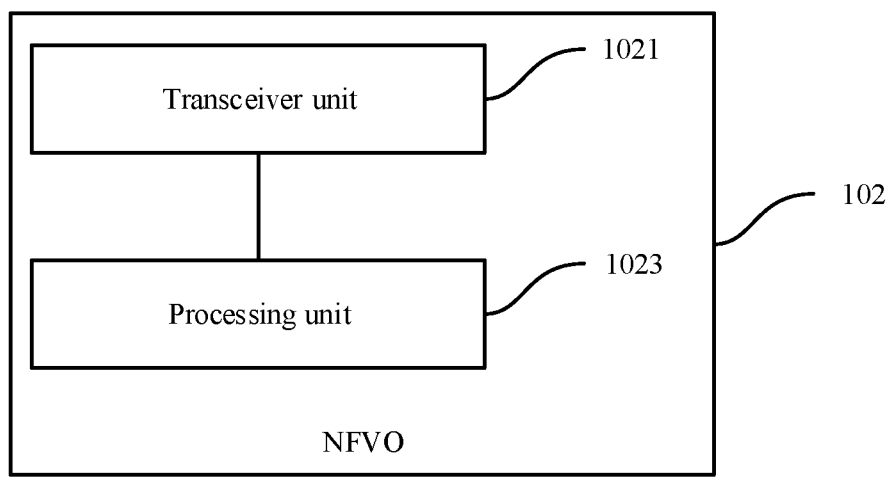
FIG. 5 is a schematic diagram of a structure of an NFVO according to an embodiment of this disclosure.

For step 416, the NFVO may first send, to the VNFM for each identifier of the NVFD that is obtained in step 415, the VNF instance identifier create request carrying the identifier of the VNFD, so that the VNFM allocates the VNF instance identifier for the identifier of the VNFD. After receiving the VNF instance identifier allocated by the VNFM for the identifier of the VNFD, the NFVO may further send the VNF instantiation request carrying the VNF instance identifier to the VNFM, so that the VNFM obtains the corresponding VNFD or the VNF package including the VNFD and instantiates the VNF by using the VNFD or the VNF package including the VNFD, that is, performs corresponding information exchange with the VIM based on the VNFD or the VNF package including the VNFD, to complete creation of the VNF. Based on the same concept as the foregoing embodiments, as shown in FIG. 5, an embodiment of this disclosure further provides an NFVO 102. The NFVO 102 includes a transceiver unit 1021 and a processing unit 1023.

The transceiver unit 1021 is configured to receive a network service NS instantiation request.

The processing unit 1023 is configured to determine an NSD based on the NS instantiation request, where the NSD includes a node type of a VNF; obtain VNFPI associated with the node type; obtain an identifier of a VNFD from the VNFPI; and request, based on the identifier of the VNFD, a VNFM to instantiate the VNF.

In a possible implementation, the processing unit 1023 is further configured to obtain the node type from a VNFP; associate the node type with the VNFPI; obtain the identifier of the VNFD from the VNFP; and store the identifier of the VNFD in the VNFPI.

In a possible implementation, the VNFP includes a meta file, the meta file includes a declaration keyword, and a value of the declaration keyword is the node type.

The processing unit 1023 is specifically configured to search for the declaration keyword in the meta file included in the VNFP, and obtain the node type from the declaration keyword.

In a possible implementation, the VNFP includes a meta file, the meta file includes a declaration keyword, and a value of the declaration keyword is a storage path of a definition file of the node type in the VNFP.

The processing unit 1023 is configured to search for the declaration keyword in the meta file included in the VNFP; obtain the storage path of the definition file of the node type in the VNFP from the declaration keyword; and obtain the node type from the definition file of the node type based on the storage path.

In a possible implementation, the processing unit 1023 is further configured to determine address information of the definition file of the node type based on the storage path and a storage location of the VNFP; and the transceiver unit 1021 is further configured to send the node type and the address information to a service requester, so that the service requester generates the NSD, where the NSD includes the node type and the address information.

In a possible implementation, the processing unit 1023 is configured to determine an identifier of the VNFPI; associate the node type with the identifier of the VNFPI; obtain the identifier of the VNFPI associated with the node type, and obtain the VNFPI based on the identifier of the VNFPI.

In a possible implementation, the VNFP includes a manifest file, and the manifest file includes the identifier of the VNFD; and the processing unit 1023 is configured to obtain the identifier of the VNFD from the manifest file included in the VNFP. An embodiment of this disclosure further provides a computer-readable storage medium configured to store instructions. When the instructions are executed by a processor of a computing device, the computing device is enabled to implement the NS instantiation method provided in any embodiment of this disclosure.

An embodiment of this disclosure provides a computer program product. The computer program product includes computer program code. When the computer program code is run on a computing device, the computing device is enabled to perform the NS instantiation method provided in any embodiment of this disclosure.

An embodiment of this disclosure provides a computing device, including a memory and a processor. The memory stores executable code. When executing the executable code, the processor implements the NS instantiation method provided in any embodiment of this disclosure.

An embodiment of this disclosure further provides a chip system. The chip system includes a processor, configured to implement functions of an NFVO in any embodiment of this disclosure, for example, receiving or processing data and/or information in the NS instantiation method in any embodiment of this disclosure. In a possible design, the chip system further includes a memory. The memory is configured to store program instructions and/or data. The chip system may include a chip, or may include a chip and another discrete device.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of embodiments of this disclosure.

It should be understood that sequence numbers of the foregoing processes do not mean execution sequences in various embodiments of this disclosure. The execution sequences of the processes should be determined according to functions and internal logic of the processes, and should not be construed as any limitation on the implementation processes of embodiments of this disclosure.

It may be clearly understood by a person skilled in the art that, for ease and brevity of description, reference may be made to a corresponding process in the method embodiments for a detailed working process of the network device. Details are not described herein again.

It may be understood that the foregoing described apparatus embodiment is an example. For example, the module/unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The foregoing descriptions are merely specific implementations of embodiments of this disclosure, but are not intended to limit the protection scope of embodiments of this disclosure. Any variation or replacement readily figured out by a person skilled in the art within the technical scope disclosed in embodiments of this disclosure shall fall within the protection scope of embodiments of this disclosure.

Finally, it should be noted that the foregoing embodiments are merely intended for describing the technical solutions of this disclosure, but not for limiting this disclosure. Although this disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this disclosure.

What is claimed is:

1. A method implemented by a network functions virtualization orchestrator (NFVO), wherein the method comprises:

creating virtualized network function package information (VNFPI) for each virtualized network function (VNF) included in a network service (NS);

obtaining a node type of each VNF from a respective VNF package (VNFP) corresponding to the VNF, wherein the VNFP comprises a VNF descriptor (VNFD);

associating the node type with the respective VNFPI;

obtaining a first identifier of the VNFD indicating the VNFD from each VNFP;

storing the first identifier of the VNFD in the respective VNFPI;

receiving a NS instantiation request for the NS;

providing network service description information (NSD) based on the NS instantiation request, wherein the NSD comprises the node type of each VNF;

obtaining the respective VNFPI associated with the node type;

obtaining the first identifier of the VNFD from the respective VNFPI; and requesting, based on the first identifier, a virtualized
network function manager (VNFM) to instantiate the
respective VNF.

2. The method of claim 1, wherein the VNFP comprises a meta file that comprises a declaration keyword, wherein a value of the declaration keyword is the node type, and wherein the method further comprises:
searching for the declaration keyword in the meta file; and
obtaining the node type from the declaration keyword.

3. The method of claim 1, wherein the VNFP comprises a meta file that comprises a declaration keyword, wherein a value of the declaration keyword is a storage path of a definition file of the node type in the VNFP, and wherein the method further comprises:
searching for the declaration keyword in the meta file;
obtaining the storage path of the definition file of the node type in the VNFP from the declaration keyword; and
obtaining the node type from the definition file of the node type based on the storage path.

4. The method of claim 3, further comprising:
providing, before receiving the NS instantiation request, address information of the definition file of the node type based on the storage path and a storage location of the VNFP; and
sending the node type and the address information to a service requester to enable the service requester to generate the NSD, wherein the NSD further comprises the address information.

5. The method of claim 1, further comprising:
determining or obtaining a second identifier of the VNFPI;
associating the node type with the second identifier; and
obtaining the VNFPI based on the second identifier.

6. The method of claim 5, wherein the VNFP comprises a manifest file that comprises the first identifier, and wherein the method further comprises obtaining the first identifier from the manifest file.

7. The method of claim 1, wherein the VNF is configured according to a topology and orchestration specification for cloud applications (TOSCA) that defines the NSD and the VNFD.

8. A network functions virtualization orchestrator (NFVO) comprising:
at least one processor; and
one or more memories coupled to the at least one processor and configured to store programming instructions, that when executed by the at least one processor, cause the NFVO to:
create virtualized network function package information (VNFPI) for each virtualized network function (VNF) included in a network service (NS);
obtain a node type of each VNF from a VNF package (VNFP) corresponding to the VNF, wherein the VNFP comprises a VNF descriptor (VNFD);
associate the node type with the respective VNFPI;
obtain a first identifier of the VNFD indicating the VNFD from each VNFP;
store the first identifier of the VNFD in the respective VNFPI;
receive a NS instantiation request for the NS;
provide network service description information (NSD) based on the NS instantiation request, wherein the NSD comprises the node type of each VNF;
obtain the respective VNFPI associated with the node type;
obtain the first identifier of the VNFD from the respective VNFPI; and request, based on the first identifier, a virtualized network function manager (VNFM) to instantiate the respective VNF.

9. The NFVO of claim 8, wherein the VNFP comprises a meta file that comprises a declaration keyword, wherein a value of the declaration keyword is the node type, and wherein the programming instructions, when executed by the at least one processor, further cause the NFVO to search for the declaration keyword in the meta file, and obtain the node type from the declaration keyword.

10. The NFVO of claim 8, wherein the VNFP comprises a meta file that comprises a declaration keyword, wherein a value of the declaration keyword is a storage path of a definition file of the node type in the VNFP, and wherein the programming instructions, when executed by the at least one processor, further cause the NFVO to search for the declaration keyword in the meta file, obtain the storage path of the definition file of the node type in the VNFP from the declaration keyword, and obtain the node type from the definition file of the node type based on the storage path.

11. The NFVO of claim 10, wherein the programming instructions, when executed by the at least one processor, further cause the NFVO to:
provide address information of the definition file of the node type based on the storage path and a storage location of the VNFP; and
send the node type and the address information to a service requester to enable the service requester to generate the NSD, wherein the NSD further comprises the address information.

12. The NFVO according to claim 8, wherein the programming instructions, when executed by the at least one processor, further cause the NFVO to:
determine or obtain a second identifier of the VNFPI;
associate the node type with the second identifier; and
obtain the VNFPI based on the second identifier.

13. The NFVO according to claim 8, wherein the VNFP comprises a manifest file that comprises the first identifier, and wherein the programming instructions, when executed by the at least one processor, further cause the NFVO to obtain the first identifier of the VNFD from the manifest file.

14. The NFVO of claim 8, wherein the VNF is configured according to a topology and orchestration specification for cloud applications (TOSCA) that defines the NSD and the VNFD.

15. A non-transitory computer-readable medium comprising a computer program product that, when executed by a processor, cause an apparatus to:
create virtualized network function package information (VNFPI) for each virtualized network function (VNF) included in a network service (NS);
obtain a node type of each VNF from a VNF package (VNFP) corresponding to the VNF, wherein the VNFP comprises a VNF descriptor (VNFD);
associate the node type with the respective VNFPI;
obtain a first identifier of the VNFD indicating the VNFD from each VNFP;
store the first identifier of the VNFD in the respective VNFPI;
receive a NS instantiation request for the NS;
provide network service description information (NSD) based on the NS instantiation request, wherein the NSD comprises the node type of each VNF;
obtain the respective VNFPI associated with the node type;
obtain the first identifier of the VNFD from the respective VNFPI; and request, based on the first identifier, a virtualized network function manager (VNFM) to instantiate the respective VNF.

16. The non-transitory computer-readable medium of claim 15, wherein the VNFP comprises a meta file that comprises a declaration keyword, wherein a value of the declaration keyword is the node type, and wherein the computer program product further cause the apparatus to:
search for the declaration keyword in the meta file; and
obtain the node type from the declaration keyword.

17. The non-transitory computer-readable medium of claim 15, wherein the VNFP comprises a meta file that comprises a declaration keyword, wherein a value of the declaration keyword is a storage path of a definition file of the node type in the VNFP, and wherein the computer program product further cause the apparatus to:
search for the declaration keyword in the meta file;
obtain the storage path of the definition file of the node type in the VNFP from the declaration keyword; and
obtain the node type from the definition file of the node type based on the storage path.

18. The non-transitory computer-readable medium of claim 17, wherein the computer program product further cause the apparatus to:
provide, before the receiving the NS instantiation request, address information of the definition file of the node type based on the storage path and a storage location of the VNFP; and
send the node type and the address information to a service requester to enable the service requester to generate the NSD, wherein the NSD further comprises the address information.

19. The non-transitory computer-readable medium of claim 15, wherein the computer program product further cause the apparatus to:
determine or obtain a second identifier of the VNFPI;
associate the node type with the second identifier; and
obtain the VNFPI based on the second identifier.

* * * * *